United States Patent Office 3,686,142
Patented Aug. 22, 1972

3,686,142
COPOLYMERS OF TRIOXANE WITH ANY ONE OF VINYL CYCLOHEXENE DIOXIDE; RESORCINOL DIGLYCIDYL ETHER, A DIGLYCIDYL ETHER OF 2,2'-BIS(4-HYDROXY PHENYL) PROPANE AND THE TRIGLYCIDYL ETHER OF TRIMETHYLOLPROPANE
Walter E. Heinz, New Providence, and Francis B. McAndrew, Springfield, N.J. (both % Celanese Corp. of America, Summit, N.J. 07901)
No Drawing. Continuation of application Ser. No. 864,959, Oct. 6, 1969, which is a continuation of application Ser. No. 708,428, Feb. 26, 1968, which is a continuation of application Ser. No. 444,787, Apr. 1, 1965, which is a continuation-in-part of application Ser. No. 229,715, Oct. 10, 1962, which in turn is a continuation-in-part of application Ser. No. 153,720, Nov. 20, 1961, all now abandoned. This application July 23, 1970, Ser. No. 64,050
Int. Cl. C08g 1/04, 30/00
U.S. Cl. 260—47 FP
10 Claims

ABSTRACT OF THE DISCLOSURE

An improved moldable terpolymer of trioxane, cyclic ether and a compound selected from the group consisting of vinyl cyclohexane dioxide, resorcinol diglycidyl ether and a diglycidyl ether of 2,2'-bis(4-hydroxyphenyl) propane is described.

This application is a continuation of application Ser. No. 864,959 filed Oct. 6, 1969 now abandoned, which in turn is a continuation of application Ser. No. 708,428 filed Feb. 26, 1968, now abandoned, which in turn is a continuation of application Ser. No. 444,787 filed Apr. 1, 1965, now abandoned, which is a continuation-in-part of application Ser. No. 229,715 filed Oct. 10, 1962, now abandoned, which in turn is a continuation-in-part of application Ser. No. 153,720 filed Nov. 20, 1961, now abandoned.

This invention relates to oxymethylene polymers and particularly to tough, high molecular weight, moldable branched polymers having successively recurring oxymethylene groups in the polymer chains and in the polymer branches.

Oxymethylene polymers of exceptional toughness and high molecular weight may be prepared by polymerizing a source of oxymethylene units. A preferred polymer may be obtained by polymerizing trioxane in the presence of a cationic catalyst such as boron fluoride-containing catalysts, including boron fluoride, itself and boron fluoride coordinate complexes with organic compounds in which oxygen or sulfur is the donor atom.

Oxymethylene polymers of improved thermal stability may be prepared by introducing into the polymer chains, or attaching to the ends of the polymer chains, structures which are resistant to thermal detachment. The polymers may incorporate interspersed oxyalkylene units with adjacent carbon atoms, and preferably oxyethylene units as disclosed in Pat. No. 3,027,352 of Walling, Brown and Bartz. Copolymers of this type may be described as having at least one chain containing oxymethylene (—OCH$_2$—) units (usually between about 85 and 99.9 mol percent) interspersed with —O—R— units (usually between 0.1 and about 15 mol percent) wherein R is a divalent radical containing at least two carbon atoms which are directly linked to each other and which are positioned in the chain between the two valences, with any substituent in the R radical being inert. Specific interspersed monomeric units which may be incorporated include those derived from lactones, carbonates, cyclic acid anhydrides of ethylenically unsaturated compounds, such as styrene, divinyl ether, vinyl acetate, vinyl methyl ketone or acrolein as disclosed by an article by Kern et al. in Angewandte Chemie 73(6), pp. 177–186 (Mar. 21, 1961) and an article by Sitting in Petroleum Refiner 41(11), pp. 131–170, November 1962. The polymers may be end-capped by acylation or etherification after polymerization or during polymerization by use of selected chain transfer agents. These stabilization methods are also disclosed in the Kern et al. and Sittig articles.

For some applications, it is desired to have polymers which flow readily at elevated temperatures while for other applications it is desired to have polymers which resist such flow. The melt index, which is related to molecular weight, provides an indication of the ease of flow of a polymer.

The melt index is determined by heating a sample of a polymer in a standard cylinder to a standard temperature of 190° C. and forcing it under a standard load of 2.160 kg. through a standard orifice of 0.0825 in. diameter and 0.315 in. long for a standard period and weighing the polymer passing through the orifice during this period. The results are reported in grams per 10 minutes. The test is described in detail in ASTMD-1238-57T.

The melt index (10×) is generally used when melt index values are low and is determined in an identical manner except that the standard load is increased tenfold to 21.60 kg.

The preparation of relatively rigid low melt index polymers in the past has required the use of feed materials of exceptionally high purity since impurities tend to act as chain terminators in polymerizations and tend to limit the molecular weight of the polymer. The necessity for exceptionally pure feed materials is a serious process disadvantage.

In addition, the relatively rigid low melt index polymers as prepared are difficult to process in that they have an extremely narrow temperature range of processability.

It is an object of this invention to provide low melt index oxymethylene polymers of improved processability and to provide a method for preparing low melt index oxymethylene polymers which does not require feed materials of exceptionally high purity.

In accordance with one aspect of this invention there is provided a moldable oxymethylene polymer having branched chains, said chains comprising a plurality of branches of successively recurring oxymethylene units.

Such polymers may be prepared by copolymerizing trioxane with a small amount of a chain branching agent, the small amount being sufficient to provide a branched oxymethylene structure but insufficient to make the polymer intractable by forming a highly cross-linked structure. Primary chains are linear chains comprising successively recurring oxymethylene units and are the chains which would be produced if the chain branching agent were omitted from the system. The amount of chain branching agent used is generally not more than that required to provide an average of one cross-link to another chain for each primary chain in the system.

Since the polymer components are incorporated into the polymer structure during the polymerization process rather than in an after treatment of the polymer, the chain branching agent linking units are dispersed randomly and uniformly throughout the polymer rather than being concentrated at the surface of the polymer particles.

Suitable chain branching agents, depending on the particular circumstances involved, include those having at least two functional oxygen groups including (1) cyclic ethers having at least two cyclic ether rings, and particularly those compounds having (a) at least two epoxy rings (b) at least two dioxacyclo rings, or (c) at least one epoxy ring and at least one dioxacyclo ring, and (2) compounds having at least two oxo groups such as dialdehydes and diketones, preferably having from 3 to 20 carbon atoms.

The cyclic ether rings should preferably have from two to ten carbon atoms in each ring, with at least two of the carbon atoms in each ring being adjacent.

Epoxy rings are those having the structure

(the hydrogen atoms and certain bonds not part of the ring structure have been omitted in this and other formulae for reasons of clarity), where $x$ is between 0 and 3 inclusive.

Epoxy rings, where $x=0$, are oxirane rings or 1,2-epoxy rings and compounds having at least two oxirane rings include poly(1,2-epoxides) including diepoxides, triepoxides, etc.

Suitable poly(1,2-epoxides) include those which may be prepared by the epoxidation of compounds having two or more olefinic linkages. Diepoxides of diolefins are usually used and the epoxidized olefinic bonds may be of aliphatic or cycloaliphatic structures.

Suitable poly(1,2-epoxides) also include polyglycidyl ethers of polyhydric alcohols, made by reacting a polyhydric alcohol and epichlorohydrin with an acidic catalyst such as boron trifluoride, and subsequently treating the resulting product with an alkaline material. Included among the polyhydric alcohols that can be used in the preparation of these polyepoxides are glycerine, ethylene glycol, propylene glycol, diethylene glycol, hexanetriol, pentaerythritol, trimethylolethane, trimethylolpropane, etc. In addition, polyhydric ether alcohols, for instance diglycerol, dipentaerythritol, polyalkylene glycols and hydroxyalkyl ethers of the aforementioned polyhydric phenols can be used.

Suitable diepoxides include butadiene dioxide

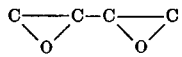

1,2,3,4-pentadiene dioxide; 1,2,4,5-pentadiene dioxide; 1,2,5,6-hexadiene dioxide; 1,2,3,4-hexadiene dioxide; 1,2,6,7-heptadiene dioxide; 1,2,7,8-octadiene dioxide; etc.; diglycidyl oxalate

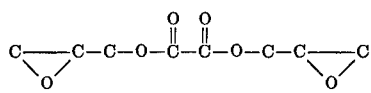

diglycidyl malonate; diglycidyl succinate; diglycidyl glutarate; diglycidyl adipate; diglycidyl pimelate; diglycidyl suberate; diglycidyl azelate; diglycidyl sebacate; etc.; ethylene glycol diglycidyl ether

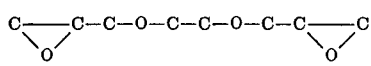

1,3-propanediol diglycidyl ether; 1,4-butanediol diglycidyl ether; 1,5-pentanediol diglycidyl ether; 1,2-hexanediol diglycidyl ether; etc. Other suitable diepoxides include vinyl cyclohexene dioxide (1-epoxyethyl-3,4-epoxy cyclohexane); linonene dioxide; dicyclopentadiene dioxide, bis-epoxydicyclopentyl ether of ethylene glycol; dipentene dioxide; dicrotylidene pentaerythritol diepoxide; etc.

Additional epoxides include glycidyl ethers of polyhydric phenols obtained by reacting a polyhydric phenol in an excess of epichlorohydrin with sodium hydroxide. Such polyhydric phenols include bisphenol A (p,p'-dihydroxydiphenyl propane), resorcinol, hydroquinone, 4,4'-dihydroxy benzophenone, bis(4-hydroxyphenyl ethane), 1,5-dihydroxynaphthalene, 4,4'-dihydroxy biphenyl, novolak resins containing more than 2 phenol moieties linked through methylene bridges, and the like.

Suitable triepoxides include triglycidyl trimethylol propane prepared by reacting the triallyl ether of trimethylol-propane in a solvent with peracetic acid at a temperature of 0 to 75° C. (as disclosed in application Ser. No. 152,672, filed on Nov. 15, 1961 by Sammy Carpenter). Suitable polyepoxides include a polyepoxy glyceryl ester containing an average of 5.5 epoxy groups per molecule, known as Epoxol 9-5, and a condensation product of bisphenol-A and epichlorohydrin, known as Epon Resin No. 812.

Other polyepoxide resins useful in this invention are described in "Epoxy Resins" by Lee and Neville, McGraw-Hill Book Company, Inc., 1957.

The cyclic ether rings may also be dioxacyclo rings having the formula

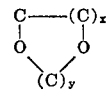

where $x$ and $y$ are integers from 1 to 20 and at least one of $x$ and $y$ must be at least 1. When $y$ is 1 these rings include acetal rings (rings having at least one

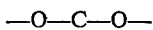

group—the term "acetal" includes "formal," which is —O—CH$_2$—O—).

Suitable chain branching agents having at least two acetal rings include erythritol diformal

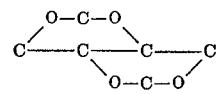

2,2-(trimethylene)bis-1,3-dioxolane

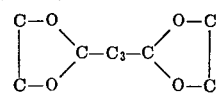

2,2-(phenylene)bis-1,3-dioxolane

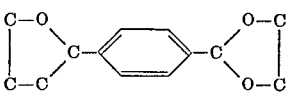

pentaerythritol diformal

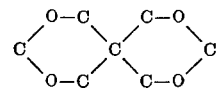

pentaerythritol diacetal

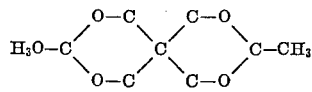

pentaerythritol dibenzal

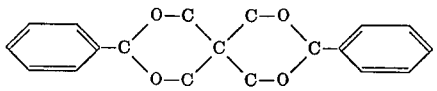

pentaerythritol dichloral

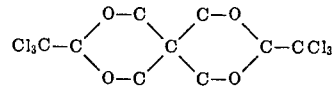

pentaerythritol dipropionaldehyde acetal

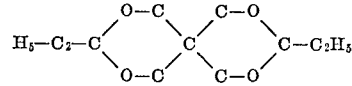

bis-1,3-dioxolane from 1,4-butanediol diglycidyl ether and formaldehyde

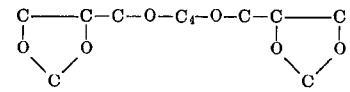

bis-1,3-dioxolane from diglycidyl ether and formaldehyde

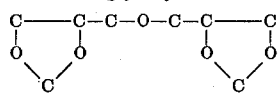

diformal of diethyl saccharate

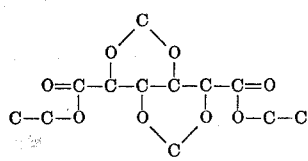

sorbitol triformal

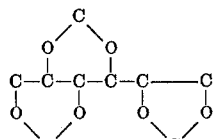

pentaerythritol diisolvaleraldehyde acetal

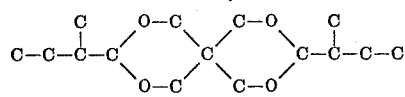

polyvinyl formal

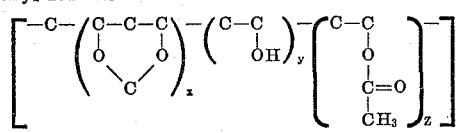

(In suitable products $x$ is usually 9 or 10 times the magnitude of $y$ and $z$).

pentaerythritol diacrolein acetal

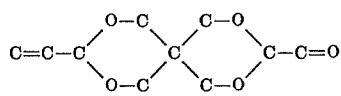

pentaerythritol diglyoxaldehyde acetal

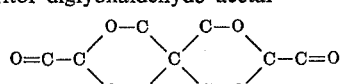

pentaerythritol di-p-nitrobenzaldehyde acetal

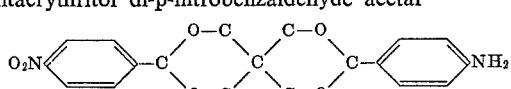

diisopropylidene aldehyde-D-arabinose

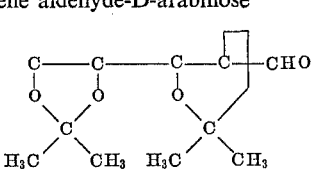

dimethylene iditol

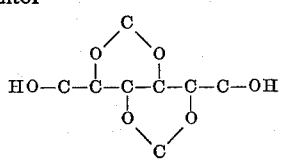

1,2:3,4:5,6-triisopropylidene mannitol

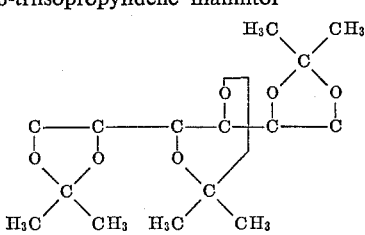

Other suitable dioxacyclo ring-containing materials include diacetals of a dialdehyde and a polyhydric alcohol having the following structure:

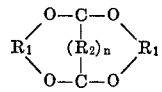

Wherein $R_1$ derives from a polyhydric alcohol ($R_1(OH)_2$ or $HO-R_1-OH$) having from 1 to 8 carbon atoms.

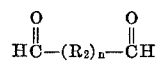

is a dialdehyde having from 1 to 8 carbon atoms and in which $n$ is an integer from 0 to 1. This type of compound may be prepared by reacting a selected dialdehyde with a selected polyhydric alcohol under conventional acetalization conditions. Alpha-omega dihydric alcohols are preferred.

A preferred bridged ring oxacyclic compound of this type is the diacetal of malonaldehyde and ethylene glycol, having the following structure:

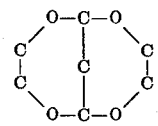

Other dialdehydes which may be used include oxaldehyde, succinaldehyde, glutaraldehyde, etc., etc.

Other polyhydric alcohols which may be used include glycerol, 1,2-propylene glycol, 1,2-butylene glycol, 1,3-propylene glycol, trimethylol-propane, sorbitol and diethylene glycol.

Suitable chain branching agents having at least one epoxy ring and at least one acetal ring include the above diepoxides where one epoxy ring has been replaced by an acetal ring, such as monocrotylidene trimethylolethane monoepoxide, etc., etc.

Compounds having at least two oxo groups preferably contain from 2 to 20 carbon atoms and have each functional oxo group positioned adjacent one of at least two adjacent carbon atoms.

Suitable materials include:

| | |
|---|---|
| glyoxal | OHC—CHO |
| malonic aldehyde | OHC—C—CHO |
| succinic aldehyde | OHC—(CH$_2$)$_2$—CHO |
| glutaraldehyde | OHC—(CH$_2$)$_3$—CHO |
| terephthaldehyde | OHC—⟨C$_6$H$_4$⟩—CHO |
| adipaldehyde | OHC—(CH$_2$)$_4$—CHO |
| o-phthalaldehyde | (benzene ring with two adjacent CHO groups) |
| m-phthalaldehyde | (benzene ring with meta CHO groups) |
| acrolein dimer | (cyclic structure with CHO) |
| etc. | |

While it is not desired to be bound by any particular theory, it is believed that under polymerization conditions, the trioxane rings open to become a short chain of three oxymethylene units and the functional oxygen groups on the chain-branching agent open to become substituted oxyalkylene units. As the cyclic ether preferably contains at least two adjacent carbon atoms which are adjacent the functional oxygen group, the substituted oxyalkylene units contain at least two carbon atoms in the primary oxymethylene polymer chain. Specifically, when a poly(1,2-epoxide) is used, the 1,2-epoxy rings open to become substituted oxyethylene units. When one of the functional oxygen groups has reacted to form a part of the primary polymer chain, the other functional oxygen group is available for further reaction. The further reaction may occur comparatively early in the formation of the polymer and may react with a comparatively short oxymethylene polymer units. When this is the case, the branch may continue to grow by the addition of other oxymethylene units, usually the triple oxymethylene units from the trioxane molecule. Also it is possible that the unreacted functional oxygen unit of the chain-branching unit will not react until comparatively late in the polymerization when it may react with a comparatively long oxymethyelne polymer chain to form a comparatively large branch. Of course, the branch itself may have chain-branching agents contained therein and the branch therefore may very well contain additional branches. In effect then the substituted oxyethylene units from a single polyepoxide molecule may be found in each of two or more oxymethylene polymer chains which result in the branching of the primary oxymethylene polymer chain to form a branched structure.

The branches of course are also primarily oxymethylene units and normally have a similar composition to that of the main primary polymer chain. In a preferred embodiment the branches on the primary polymer chain contain between about 10 and about 500 carbon atoms and the primary polymer chain contains between about 10 and about 1000 carbon atoms.

It should be noted that the degree of chain branching is comparatively slight and that the polymer product is not intractable. The product is thermoplastic and is soluble in the usual solvents for oxymethylene polymers. Of course it is possible to form a highly cross-linked polymer by this technique where a comparatively large amount of the chain-branching agent is present and where cross-links are formed between other primary polymer chains. In the preferred thermoplastic polymers, however, there is no more than one cross-link formed between each primary polymer chain.

The polymer of this invention, when finely divided, will dissolve substantially completely in p-chlorophenol to the extent of at least 0.1 weight percent at 60° C. The polymers are also substantially completely soluble in a hydrolysis solvent containing 60 wt. percent of methanol, and 40 wt. percent of water when heated with the solvent at a polymer/solvent ratio of 100/670 by weight to a temperature of 160° C.

The polymers flow readily under pressure. The melt index of these polymers may be a slow as zero gm./10 min. (no visible flow at standard test pressure) but the 10× melt index is preferably between about 10 and about 500 gm./10 min.

To form thermoplastic polymers, the chain branching agents are usually copolymerized with the trioxane in proportions from about 0.01 to about 7 weight percent, preferably less than about 1%, and most preferably from about 0.01 to about 0.80 weight percent of the chain branching agent based on the weight of trioxane. When the chain branching agent and trioxane are copolymerized as the sole monomers in the system, the product is improved over the comparable polymerization product where trioxane alone is used. Such copolymers are particularly useful when end-capped by acetylation or etherification as disclosed in the Kern et al. or Sitting articles referred to above. However, in its optimum embodiment, terpolymers are produced containing, in addition to oxymethylene groups and groups from the chain branching agent, —O—R— groups having adjacent carbon atoms as described below.

Preferred terpolymers have chains containing (1) oxymethylene groups interspersed with (2) oxyalkylene groups with adjacent carbon atoms (preferably derived from cyclic ethers having adjacent carbon atoms and having a single cyclic ether ring) and (3) oxyalkylene groups having carbon atoms linked to chain branches, the last named groups being derived from the chain branching agents.

Preferred terpolymers are those wherein the (2) oxyalkylene groups with adjacent carbon atoms are oxyethylene groups derived by opening the ring structure of cyclic ethers having a single cyclic ether ring and containing oxyethylene groups, such as ethylene oxide and 1,3 dioxolane.

Other specific cyclic ethers, having adjacent carbon atoms and having a single cyclic ether ring, which may be used are 1,3,5-trioxepane, 1,3-dioxane, trimethylene oxide, pentamethylene oxide, 1,2-propylene oxide, 1,2-butylene oxide, neopentyl formal, tetrahydrofurane and butadiene monoxide. Preferably the single cyclic ether ring should have between 2 and about 10 carbon atoms. Because of the fact that the inclusion of the chain branching agent produces polymers of lower melt index, terpolymers containing relatively high proportions of such cyclic ethers with adjacent carbon atoms, e.g. above about 10 wt. percent, are substantially improved over comparable copolymers containing no chain branching agent.

The products of this invention generally contain more than about 75% by weight, perferably more than about 95% by weight of oxymethylene groups.

In the preferred terpolymers there is generally from about 75 to 99.9 percent by weight of recurring oxymethylene units, from about 0.1 to about 25 percent by weight of recurring oxyalkylene groups having adjacent carbon atoms (preferably derived from a cyclic ether having a single cyclic ether ring which has adjacent carbon atoms therein) and from about 0.01 to about 7 weight percent of units derived from the chain branching agent. The most preferred terpolymers have from about 96.1 to 97.9 percent by weight of oxymethylene units, 2.0 to 2.9 percent by weight of oxyethylene units and less than about 1%, preferably between about 0.02 and 0.80 percent by weight, of units from the chain branching agent.

The preferred catalysts used in the preparation of the desired copolymers are molecular boron fluoride and the boron fluoride coordinate complexes with organic compounds in which oxygen or sulfur is the donor atom.

The coordinate complex of boron fluoride may, for example, be a complex with a phenol, an ether, an ester, or a dialkyl sulfide. Boron fluoride dibutyl etherate, the coordinate complex of boron fluoride with dibutyl ether, is the preferred coordination complex. The boron fluoride complex with diethyl ether is also very effective. Other boron fluoride complexes which may be used are the complexes with methyl acetate, with ethyl acetate, with phenyl acetate, with dimethyl ether, with methyl phenyl ether and with dimethyl sulfide.

The boron fluoride-containing catalyst should be present in the polymerization zone in amounts such that its boron fluoride content is between about 0.0002 and about 1.0 weight percent based on the weight of the monomers in the polymerization zone. Preferably, amounts between about 0.003 and about 0.03 weight percent should be used in continuous operation and between about 0.0002 and about 0.02% in a batch process.

The monomers in the reaction zone are preferably anhydrous or substantially anhydrous. Small amounts of moisture, such as may be present in commercial grade reactants or may be introduced by contact with atmospheric air will not prevent polymerization, but should be removed for best yields.

In a specific embodiment of this invention, the trioxane, cyclic ether and chain branching agent are blended with catalyst dissolved in an anhydrous solvent such as cyclohexane and permitted to react in a sealed reaction zone while subjected to a constant shearing action. The temperature in the reaction zone may vary from about 0° C. to about 100° C. The period of reaction may vary from about 5 minutes to about 72 hours. Pressures from subatmospheric to about 100 atmospheres, or more may be used.

To reproducibly control the molecular weight of the polymer product a small amount (from about 100 to about 3000 p.p.m., based on the weight of trioxane) of a chain transfer agent, such as methylal, may be included in the reaction mixture, as disclosed in Application Ser. No. 89,371, filed by Schnizer, Heinz and Seddon on Feb. 15, 1961.

Upon completion of the polymerization reaction it is desirable to neutralize the activity of the polymerization catalyst since prolonged contact with the catalyst degrades the polymer. The polymerization product may be treated with an aliphatic amine, such as tri-n-butyl-amine, in stoichiometric excess over the amount of free catalyst in the reaction product, and preferably in an organic wash liquid which is a solvent for unreacted trioxane. Or, if desired, the reaction product may be washed with water which neutralizes catalyst activity. A detailed description of the methods of neutralizing catalyst activity may be found in U.S. Pat. No. 2,989,509 of June 20, 1961.

An additional feature of this invention lies in the unusually attractive appearance of molded products produced from the polymers of this invention. Extruded products from the usual oxymethylene polymers have surfaces which may vary in appearance from a matte finish to a satiny sheen. Molded products from the polymers of this invention have glossy surfaces and resemble glazed porcelain in appearance.

The polymerization products of this invention are characterized by a high $10\times$ to $1\times$ melt index ratio. The $10\times$ melt index is usually between about 10 and about 500 gm./ 10 min. The $10\times/1\times$ ratio is at least 25, preferably at least 30 and most preferably between about 35 and about 150. The polymer is exceptionally easily extrudable and moldable for a material of its strength properties. In addition, the polymer is more suitable for making void-free moldings than polymers which are not branched.

The number average molecular weights of the branched polymers are generally higher than those of polymers prepared in a similar manner except for the inclusion of the chain branching agent. The magnitude of this difference in number average molecular weights may be from 2 to 10 or more times as great, depending on the type, nature and quantity of the branching agent employed.

The polymer also has an unusually high melt elasticity and is exceptionally suitable for blow molding, and vacuum forming. The resin tends to thicken and foreshorten in emerging from a constricted orifice. In blow molding this tendency to thicken and foreshorten in a depending parison partially conteracts the effect of gravity on the parison and makes it possible for a larger parison to be maintained without increasing internal stresses caused by the increased weight.

Melt elasticity is the percentage increase in extrudate diameter over orifice diameter when the polymer is extruded under standard test conditions. The test is conducted together with the melt index test described in ASTM D–1238–57T and is run by measuring the diameter of the melt index extrudate rod at a point ⅛" from its outer ends and determining its percentage increase over the diameter of the orifice. The melt elasticity of the polymer of this invention are generally in excess of about 20%, e.g. above about 30%. For an oxymethylene homopolymer of comparable melt index or for a comparable copolymer containing no chain branching agents the melt elasticity is below 10%.

The polymers have high melt strength and lend themselves to processing in operations where high melt strength is advantageous. In blow molding, for example, larger bottles may be blown without difficulty. In extruding, more intricate and larger profiles may be extruded and better dimensional control may be maintained. In the extrusion of pipe, better control of surface pulsations and wall thickness may be maintained.

In a typical blow molding operation, 4-ounce Boston round bottles may be prepared using a 2" extruder having an L/D ratio of 14/1, a die bushing I.D. of .562", a die mandrel O.D. of .200", a land length of .5", a die temperature of 340° F., a melt temperature of 380° F., a mold temperature of 230° F. and a 20–22 second cycle.

In a typical extrusion operation, a 1" I.D. pipe having a 0.08" wall is extruded through a 2½" Davis Standard Extrusion Machine having a die bushing of 1.200" I.D. and a die mandrel of 1.035" O.D. There is an external sleeve 9" long and of 1.235" I.D. adjacent to the die bushing and concentric with it. The sleeve controls the outer diameter of the pipe while the inner diameter is controlled by the draw rate. A temperature of 400° F. is maintained at the die and a temperature of 175° F. is maintained at the sleeve. Air pressure in the extruded pipe is maintained at 23 p.s.i.g. and pipe is taken up at a rate of 6½ ft./min.

Oxymethylene copolymers having interspersed carbon-to-carbon linkages can be stabilized by degrading the unstable end portions of the molecules consisting of successive terminal oxymethylene groups until a stable terminal group having a carbon-to-carbon linkage (e.g. an oxyethylene terminal group) is reached. The degradation may be by thermal degradation, as disclosed in U.S. Pat. 3,103,499 by Dolce and Berardinelli or by hydroysis, as disclosed in application Ser. No. 372,390 filed by Berardinelli on June 3, 1964. The preferred terpolymers of this invention may be stabilized by either of these methods. Stabilization by hydrolysis is preferred with the terpolymers since losses during stabilization are less than in stabilization by thermal degradation.

The thermal degradation rate of the polymers of this invention is reduced by the incorporation of chemical stabilizers. One suitable stabilizer system is a combination of an anti-oxidant ingredient such as phenolic antioxidant and most suitably a substituted bisphenol and an ingredient to inhibit chain scission, generally a compound or a polymer containing trivalent nitrogen atoms.

A suitable class of alkylene bisphenols includes compounds having from zero to 2 alkyl substituents on each benzene ring, each alkyl substituent having from 1 to 4 carbon atoms. The preferred alkylene bisphenols are 2,2'-methylene bis-4-(methyl-6-tertiary butyl phenyl) and 4,4'-butylidene bis-(6-tertiary butyl-3-methyl phenol). Suitable phenolic stabilizers other than alkylene bisphenols include 2,6-ditertiary butyl-4-methyly phenol, octyl phenol and p-phenyl phenol.

Suitable scission inhibitors include carboxylic polyamides, polyurethanes, substituted polyacrylamides, polyvinyl pyrrolidone, hydrazides, compounds having 1 to 6 amine groups, proteins, compounds having tertiary amine and terminal amide groups, compounds having amidine groups, cyclo-aliphatic amine compounds and aliphatic acylureas. Suitable scission inhibitors as well as suitable anti-oxidants and proportions are disclosed in U.S. Pat. No. 3,152,101 by Dolce, U.S. Pat. No. 3,144,431 by Dolce, Berardinelli and Hudgin, application Ser. No. 258,126 filed by Berardinelli on Feb. 13, 1963. Application Ser. No. 838,832, filed by Dolce and Hudgin on Sept. 9, 1959, application Ser. No. 262,348, filed by Kray and Dolce on Mar. 4, 1963, application Ser. No. 256,146, filed by Berardinelli, Kray and Dolce on Feb. 4, 1963, U.S. Pat. No. 3,133,896 by Dolce and Berardinelli and U.S. Pat. No. 3,156,699 by Kray and Dolce. The disclosures of the above-mentioned applications are incorporated herein by reference.

One suitable method of incorporation of the chemical stabilizers is by blending a dry solid stabilizer into the plastic polymer while the latter is being kneaded as on heated rolls or through an extruder.

Molding powders comprising pellets of stabilized polymer may be prepared by conventional pelleting procedures such as extrusion of the polymer into cylindrical extrudates which may range in diameter from about ⅟₁₆"

EXAMPLE I

Trioxane was blended in a sigma blade mixer with 50 p.p.m. of boron fluoride dibutyl etherate (calculated as $BF_3$), 2% by weight of ethylene oxide, 5% by weight of cyclohexane and 0.1% by weight of vinyl cyclohexene dioxide. The initial temperature was 62° C. during the 0.65 hour run. The polymer, produced in a yield of 73%, had a melting range of 165°–168° C.

The polymer was stabilized by working for one hour at 210°–215° C. after incorporation of 0.1 weight percent of cyanoguanidine and 0.5 weight percent of 2,2'-methylene-bis (4-methyl, 6-tertiary butyl phenol). The degradation rate in air of the polymer at 230° C. was 0.009 wt. percent/min. The melt index was 1.9 dg./min. and the 10× melt index was 82 dg./min. The 10×/1× melt index ratio was 43.2.

EXAMPLE II

Trioxane was blended in a sigma blade mixer with with 50 p.p.m. of boron fluoride dibutyl etherate (calculated as $BF_3$), 2% by weight of ethylene oxide, 5% by weight of cyclohexane and 0.5% by weight of vinyl cyclohexene dioxide. An additional 50 p.p.m. of catalyst in an additional 1.25% of cyclohexane was added during the one hour course of the polymerization. The initial and final temperatures were 62° C. and the peak temperature was 85° C. The polymer, produced in a yield of 87%, had a melting range of 165–169° C.

The polymer, after being stabilized in the same manner as the polymer of Example I had a degradation rate at 230° C. in air of 0.019 wt. percent/min. The melt index was 1.5 dg./min. and the 10× melt index was 111 dg./min. The 10×/1× melt index ratio was 74.0.

EXAMPLE III

Example I was repeated except that 0.5 wt. percent of butadiene dioxide was used instead of the vinyl cyclohexene dioxide. The temperature was initially 62° C., rose to 68° C. and then dropped to 62° C. during the 75 minute run. The product, recovered in a yield of 42%, had a melting range of 154–158° C.

After stabilization as in Example I, the polymer had a degradation rate in air at 230° C. of 0.009 wt. percent/min. The melt index was 6.9 dg./min., the 10× melt index was 340 dg./min. and the 10× to 1× melt index ratio was 49.

EXAMPLE IV

Trioxane was blended in a sigma blade mixer with 50 p.p.m. of boron fluoride dibutyl etherate (calculated as $BF_3$), 2% by weight of ethylene oxide, 5% by weight of cyclohexane and 0.3% by weight of the triepoxide of the triallyl ether of trimethylolpropane. An additional 50 p.p.m. of catalyst in an additional 1.25% of cyclohexane was added during the 65 minute course of the polymerization. The initial and final temperatures were 62° C. and the peak temperature was 76° C. The polymer, produced in a yield of 73%, had a melting range of 163–167° C.

The polymer, after being stabilized as in Example I had a degradation rate at 230° C. in air of 0.010 wt. percent/min. The melt index was 2.1 dg./min. and the 10× melt index was 157 dg./min. The 10×/1× melt index ratio was 75.

EXAMPLE V

Trioxane was blended in a sigma blade mixer with 200 p.p.m. of boron fluoride dibutyl etherate (calculated as $BF_3$) 5% by weight of cyclohexane and 5.0% by weight of bis (epoxydicyclopentyl) ether of ethylene glycol. An additional 800 p.p.m. of catalyst in an additional 4% of cyclohexane was added during the 2.36 hour course of the polymerization. The initial temperature was 62° C. and the peak temperature was 78° C. At the end of the reaction, the product was quenched to 55° C. The copolymer, produced in a yield of 69% had a melting range of 166–175° C., a melt index of zero and a 10× melt index of 25. The polymer after being stabilized as in Example I had a degradation rate at 230° C. of 0.118 wt. percent/min.

EXAMPLE VI (a) A trioxane polymerization mixture was fed continuously to an elongated reaction vessel having a screw with interrupted threads rotating and axially reciprocating in a cylindrical barrel having rows of teeth on its inner surface. The rotation and axial reciprocation of the screw was such as to cause the teeth of the barrel to pass through the interruptions in the thread of the screw. (The apparatus is described in U.S. Pat. 2,505,125.)

The polymerization mixture contained 2.0 wt. percent of ethylene oxide, and 0.1 wt. percent of vinyl cyclohexene dioxide, both based on trioxane. The feed mixture contained 60–90 p.'p.m. of boron fluoride dibutyl etherate (based on the weight of trioxane) and sufficient cyclohexane to provide a trioxane/cyclohexane ratio of 60 to 90. The reactor was cooled by a coolant at a temperature of 155° F. at the hopper end and a temperature of 140° F. at the discharge end.

A portion of the polymer product of the above reaction was hydrolyzed in a batch using 670 parts of hydrolysis solvent per 100 parts of polymer. The hydrolysis solvent contained 59.9 wt. percent of methanol, 40.0 wt. percent of water and 0.1 wt. percent of ammonia. The hydrolysis temperature was 160° C. and the weight loss during hydrolysis was 4.0 wt. percent.

(b) The hydrolyzed terploymer was blended with 0.5 wt. percent of 2,2'-methylene-bis (4-methyl, 6-tertiary butyl phenol) and 0.1 wt. percent of cyanoguanidine for seven minutes at 210° C. in a blender having two shallow counter-rotating screws. The product had a thermal degradation rate (at 230° C. in air) of 0.007 wt. percent/min., a melt index of 0.4 dg./min., a 10× melt index of 17 dg. and a 10×/1× melt index ratio of 42.5. The polymer had an inherent viscosity of 1.89 in 0.1 wt. percent solution in p-chlorophenol.

(c) Another portion of the polymer product of the continuous reaction (unhydrolyzed) was worked for one hour at 210° C. in a blender having two shallow counter-rotating screws together with the stabilizers used in Example VI(b) in the same proportions. The weight loss during this treatment was 4.0 wt. percent. (It is to be noted that both thermal and hydrolysis stabilization of this polymer resulted in a weight loss of only 4%. For a comparable polymer prepared without vinyl cyclohexene dioxide, the weight loss is usually 7–10 wt. percent.

After the thermal stabilization treatment the polymer had a thermal degration rate of 0.008 wt. percent/min. (measured as above, a melt index of 0.6 dg./min., a 10× melt index of 26 dg./min. and a 10× to 1× melt index ratio of 43.3.

(d) In contrast, a polymer prepared as described in Example VI(a), but omitting the vinyl cyclohexene dioxide, and stabilized as described in Example VI(b) had a melt index of 1.8 dg./min., a thermal degradation rate of 0.011 wt. percent/min. and a 10× to 1× melt index ratio below 20.

(e) Still another portion of the polymer of Example VI(a) was rolled for one hour on a 2-roll mill at 178°–186° C. together with the same stabilizers used in Example VI(b) in the same proportions. The weight loss was 5.6 wt. percent and the thermal degradation rate at 230° C. was 0.012–0.014 wt. percent/min. The polymer had a melt index of 0.49, a 10× melt index of 19.9 and a 10×/1× melt index ratio of 41. The melt elasticity (percent increase in the diameter of the extrudate, measured ⅛" from its outer end, over the diameter of the extrusion orifice) was 41%. For similar copolymers

EXAMPLE VII

Trioxane was blended in a sigma blade mixer with 100 p.p.m. of boron fluoride dibutyl etherate (calculated as $BF_3$), 5 wt. percent of cyclohexane, 16.8 wt. percent of 1,3-dioxolane and 0.5 wt. percent of vinyl cyclohexene dioxide. The initial temperature was 75° C., the peak temperature was 87° C. and the final temperature was 35° C. The reaction period was 0.85 hours.

The yield of polymer was 85% of theoretical. The terpolymer had a 13.1 wt. percent content of monomeric units derived from the dioxolane and the vinyl cyclohexene dioxide.

After stabilization as in Example I the polymer had a degradation rate of 230° C. of 0.009, a melt index of 24.0, a 10× melt index of 804.2 and a 10×/1× melt index ratio of 33.5. The polymer melted in the range of 150° to 157° C. A polymer containing the same dioxolane content but containing no vinyl cyclohexene dioxide would have a substantially higher melt index.

EXAMPLE VIII

Trioxane was blended in a sigma blade mixer with 50 p.p.m. of boron fluoride dibutyl etherate (calculated as $BF_3$), 2 wt. percent of ethylene oxide, 5 wt. percent of cyclohexane and 0.5 wt. perecent of resorcinol diglycidyl ether. An additional 50 p.p.m. of catalyst in an additional 0.5 wt. percent of cyclohexene was added during the 1.25 hour course of the polymerization. The temperature ranged from 75° to 89.5° C. The polymer, produced in a yield of 86%, had a melting range of 160° to 173° C., a melt index of 11.4, a 10× melt index of 550 and a 10×/1× melt index ratio of 48.2.

This polymer had unusual melt strength and did not flow at all at 230° C. when no pressure was exerted on it. A 10 gram chunk of this polymer retained its original shape when heated at 230° C. for 45 minutes although the temperature was substantially above the melting point. A similar chunk of a similar trioxane-ethylene oxide copolymer which contained no resorcinol diglycidyl ether flowed readily upon being heated to 230° C. and flattened to a shape which had no resemblance to the original shape of the chunk.

EXAMPLE IX

Trioxane was blended in a sigma blade mixer with 50 p.p.m. of boron fluoride dibutyl etherate (calculated as $BF_3$), 2.1 wt. percent of ethylene oxide, 5 wt. percent of cyclohexane and 0.5 wt. percent of pentaerythritol diformal. During the reaction the temperature ranged from 65° to 85° C. The polymer was produced in a yield of 75.3% and, after being stabilized as in Example I, had a melt index of 2.4, a 10× melt index of 92.0 and 10×/1× melt index ratio of 38.3. The polymer had a degradation rate of 230° C. in air of 0.030 wt. percent/min.

EXAMPLE X

Trioxane was blended in a sigma blade mixer with 50 p.p.m. of boron fluoride dibutyl etherate (calculated as $BF_3$), 2.2 wt. percent of ethylene oxide, 5 wt. percent of cyclohexane and 1.0 wt. percent of pentaerythritol diformal. During the reaction the temperature ranged from 63° C. to 95° C. The polymer was produced in a yield of 85.7% and, after being stabilized as in Example I, had a melt index of 0.7, a 10× melt index of 29.1 and a 10×/1× melt index ratio of 44.7. The polymer had a degradation rate at 230° C. in air of 0.012 wt. percent/min.

EXAMPLE XI 100 parts of trioxane, 2 parts of ethylene oxide and 0.5 parts of the diacetal of malonaldehyde and ethylene glycol was placed in a glass tube. The tube was then sealed with a crown cap lined with polytetrafluoroethylene and was placed in a constant temperature bath maintained at 65° C. 50 p.p.m. of boron trifluoride dibutyl etherate (calculated as boron trifluoride) in solution in 250 times its weight of cyclohexane was injected into the tube through the cap which had a suitable provision for such injection without breaking the seal. The tube was rotated for a period of 180 minutes and was then cooled and cracked open and the products were quenched in tributyl amine in acetone to stop the reaction. After four acetone washes the product was dried in a vacuum oven at 60° C. This product was stabilized as in Example I. The degradation rate of the polymer in air at 230° C. was 0.033 wt. percent/min. and the inherent viscosity of the material was 1.7. The melt index was 1.1 dg./min. and the 10× melt index was 72 dg./min. The 10×/1× melt index ratio was 63.

EXAMPLE XII

A polymer was made in a manner similar to Example XI except that 100 p.p.m. of boron trifluoride dibutyl etherate (calculated as boron trifluoride) was used for a reaction period of 30 minutes. This material had a degradation rate in air at 230° C. of 0.051 weight percent/min. The inherent viscosity was 1.4. The melt index was 4.2 dg./min. and the 10× melt index was 380 dg./min. The 10×/1× melt index ratio was 90.

EXAMPLE XIII

A polymer was made in a fashion similar to Example XI except that 1.0 parts of the diacetal of malonaldehyde and ethylene glycol and 100 p.p.m. boron trifluoride dibutyl etherate (calculated as boron trifluoride) were used. The reaction time was 240 minutes. The degradation rate of the polymer in air at 230° C. was 0.021 wt. percent/min. The inherent viscosity was 0.9. The melt index was 66 dg./min. and the 10× melt index was 3000/min. The 10×/1× melt index ratio was 45.

EXAMPLE XIV

A polymer was made in a manner similar to that of Example XI except that 2.0 parts of sorbitol triformal were used in place of the diacetal of malonaldehyde and ethylene glycol. The reaction time was 60 minutes. The degradation rate of the polymer in air at 230° C. was 0.008 wt. percent/min. The inherent viscosity was 1.7. The melt index was 1.0 dg./min. and the 10× melt index was 40.2 dg./min. The 10×/1× melt index ratio was 40.2.

EXAMPLE XV

Trioxane was blended in a sigma blade mixer with 50 p.p.m. of boron fluoride dibutyl etherate (calculated as $BF_3$), 2.0 weight percent of ethylene oxide, 5 weight percent of cyclohexane, and 0.1 weight percent of a diglycidyl ether of bisphenol A (sold by Shell Chemical Company as Epon 828) having a Gardner color at 25° C. of 12 maximum, an epoxide equivalent of 175–210, an average molecular weight of 350–400, a viscosity at 25° C. of 500 to 15,000 centipoises and which is a liquid at room temperature. After a reaction time of 60 minutes a polymer was produced in a yield of 83% and, after being stabilized as in Example I, the polymer had a melt index of 0.38 dg./min., a 10× melt index of 27.0 dg./min. and a 10×/1× melt index ratio of 71. The polymer had a degradation rate in air at 230° C. of 0.015 weight percent/minute and an inherent viscosity of 2.0.

EXAMPLE XVI

A polymer was made and treated in a fashion similar to Example XV except that 0.5 wt. percent of Epon 828 was used rather than 0.1%. The polymer was obtained in a yield of 83% and had a melt index of 0.26 dg./min., a 10× melt index of 25.2 dg./min., and a 10×/1× ratio of 97. The polymer had a degradation rate of 230° C.

in air of 0.016 wt. percent/min. and an inherent viscosity of 2.52.

EXAMPLE XVII

A polymer was made and treated in a manner similar to that of Example XI. The materials and amounts used were the same except that the diacetal of malonaldehyde and ethylene glycol was replaced with 0.5 part by weight of a diglycidyl ether of bisphenol A sold by Jones-Dabney Co. as Epi-Rez 510 (a liquid material having a Gardner color at 25° C. of 6, an epoxide equivalent of 180–200, an average molecular weight of 350–400, and a viscosity at 25° C. of 9000–18,000 centipoises). A polymer was obtained in a yield of 74% and had a melt index of 0.17 dg./min. and a 10× melt index of 21 dg./min. with a 10×/1× melt index ratio of 123. The degradation rate of the polymer in air at 230° C. was 0.032 wt. percent/min.

EXAMPLE XVIII

The procedure in Example XI was duplicated except that the diacetal of malonaldehyde an dethylene glycol was replaced with 0.05 part by weight of butanediol diglycidyl ether. A polymer was obtained in a yield of 85% and had a melt index of 0.54 dg./min. with a 10× melt index of 30.7 dg./min. The 10×/1× melt index ratio was 57 and the degradation rate of the polymer in air at 230° C. was 0.015 weight percent/min. The inherent viscosity of the material was 1.75.

EXAMPLE XIX

The procedure of Example XII was repeated except that 0.10 weight percent of butanediol diglycidyl ether was used. A polymer was obtained in a yield of 83% having a melt index of 0.37 dg./min. and a 10× melt index of 24.4 dg./min. The 10×/1× melt index ratio was 66 and the degradation rate of the polymer in air at 230° C. was 0.016 wt. percent/min. The inherent viscosity of the material was 2.20.

EXAMPLE XX

The procedure of the previous example was repeated except that 0.25 wt. percent of butanediol diglycidyl ether was used and a polymer was obtained in a yield of 83%. This polymer had a melt index of 0.09 dg./min. and a 10× melt index of 17.9 dg./min. with a 10×/1× melt index ratio of 200. The inherent viscosity was 2.52 and the degradation rate of the polymer in air at 230° C. was 0.020 wt. percent/min.

EXAMPLE XXI

The procedure in Example XI was followed except that the diacetal of malonaldehyde and ethylene glycol was replaced with 1% of a polyvinyl formal known as Formvar 15/958, sold by Shawinigan Resins Corp. of Springfield, Mass. A polymer was obtained with a yield of 78% which had a melt index ratio of 1.82 dg./min. and a 10× melt index of 87 dg./min. The 10×/1× melt index ratio was 48 and the degradation rate of the polymer in air at 230° C. was 0.034 weight percent/min.

EXAMPLE XXII

The procedure of Example XXI was repeated using 1% of the polyvinyl formal known as Formvar 15/95E, sold also by Shawinigan Resins Corp., Springfield, Mass. After 96 minutes reaction time, a polymer was obtained in a yield of 70% which had a melt index of 0.92 dg./min. and a 10× melt index of 81 dg./min. The 10×/1× melt index ratio was 89 and the degradation rate of the polymer in air at 230° C. was 0.029 weight percent/min.

The "melting point" as used herein is the temperature at which the polymer flows under slight pressure when heated on a hot stage to raise its temperature by about 2–3° C. per minute.

It is to be understood that the foregoing detailed description is given merely by way of illustration and that many variations may be made therein without departing from the spirit of our invention.

The embodiments of the invention in which an exclusive property or privilege is claimed are defined as follows:
1. A moldable terpolymer of
    (a) from 75 to about 99.9 weight percent of trioxane
    (b) 0.1 to about 18 weight percent of a cyclic ether having a single cyclic ether ring containing adjacent carbon atoms selected from the group consisting of ethylene oxide; 1,3, dioxolane; 1,3,5-trioxepane; 1,3-dioxane, trimethylene oxide; pentamethylene oxide; 1,2-propylene oxide; 1,2-butylene oxide; neopentyl formal; tetrahydrofurane and butadiene monoxide, and
    (c) 0.01 to about 7 weight percent of a compound selected from the group consisting of vinyl cyclohexene dioxide, resorcinol diglycidyl ether, and a diglycidyl ether of 2,2'-bis(4-hydroxy-phenyl) propane.
2. The terpolymer of claim 1 wherein said cyclic ether having a single cyclic ether ring containing adjacent carbon atoms is ethylene oxide.
3. The terpolymer of claim 1 wherein said cyclic ether having a single cyclic ether ring containing adjacent carbon atoms is 1,3-dioxolane.
4. A moldable terpolymer of from about 75 to about 99.9 weight percent of trioxane, from about 0.1 to about 18 weight percent of ethylene oxide, and from about 0.01 to about 7 weight percent of resorcinol diglycidyl ether.
5. A moldable terpolymer of from about 75 to about 99.9 weight percent of trioxane from about 0.1 to about 18 weight percent of 1,3-dioxolane and from about 0.01 to about 7 weight percent of resorcinol diglycidyl ether.
6. A moldable terpolymer of from about 75 to about 99.9 weight percent of trioxane, from about 0.1 to about 18 weight percent of a cyclic ether having a single cyclic ether ring containing adjacent carbon atoms selected from the group consisting of ethylene oxide; 1,3-dioxolane; 1,3,5-trioxepane; 1,3-dioxane; trimethylene oxide; pentamethylene oxide; 1,2-propylene oxide; 1,2-butylene oxide; neopentyl formal tetrahydrofurane and butadiene monoxide and from about 0.01 to about 7 weight percent of vinyl cyclohexene dioxide.
7. The terpolymer of claim 6 wherein said cyclic ether having a single cyclic ether ring containing adjacent carbon atoms is ethylene oxide.
8. A moldable copolymer of
    (a) from about 93 to about 99.9 weight percent of trioxane and
    (b) from about 0.01 to about 7 weight percent of compound selected from the group consisting of resorcinol diglycidyl ether, the triglycidyl ether of trimethylolpropane and mixtures thereof.
9. A moldable copolymer of from about 93 to about 99.9 weight percent of trioxane and from about 0.01 to about 7 weight percent of resorcinol diglycidyl ether.
10. A moldable copolymer of from about 93 to about 99.9 weight percent of trioxane and from about 0.01 to about 7 wt. percent of the triglycidyl ether of trimethylolpropane.

References Cited
UNITED STATES PATENTS

| | | | |
|---|---|---|---|
| 3,027,352 | 3/1962 | Walling et al. | 260—67 FP |
| 3,156,671 | 11/1964 | Suter et al. | 260—67 FP |
| 3,219,630 | 11/1965 | Sidi | 260—67 FP |
| 3,346,663 | 10/1967 | Kern et al. | 260—823 |

WILLIAM H. SHORT, Primary Examiner

L. M. PHYNES, Assistant Examiner

U.S. Cl. X.R.

260—45.9 P, 45.95, 64, 67 FP, 73 R, 830; 264—176